March 11, 1924.

E. J. PASSANISI

SEAL

Filed Nov. 29, 1922

1,486,264

Inventor
Emanuele J. Passanisi
By Hull, Brock, & West
Attys.

Patented Mar. 11, 1924.

1,486,264

UNITED STATES PATENT OFFICE.

EMANUELE J. PASSANISI, OF CLEVELAND, OHIO.

SEAL.

Application filed November 29, 1922. Serial No. 603,914.

*To all whom it may concern:*

Be it known that I, EMANUELE J. PASSANISI, a subject of the King of Italy, residing at Cleveland, in the county of Cuyahoga and State of Ohio, have invented a certain new and useful Improvement in Seals, of which the following is a full, clear, and exact description, reference being had to the accompanying drawings.

This invention relates to seals such as used in connection with freight car doors, mail bags, meters and other enclosures where it is desired to prevent unauthorized persons from tampering therewith without breaking the seal and leaving evidence of such fact.

The object of the present invention is to provide a simple and inexpensive form of seal which may be easily and quickly applied, and when fastened cannot be removed without destroying the seal so that it cannot again be used.

Figure 1:
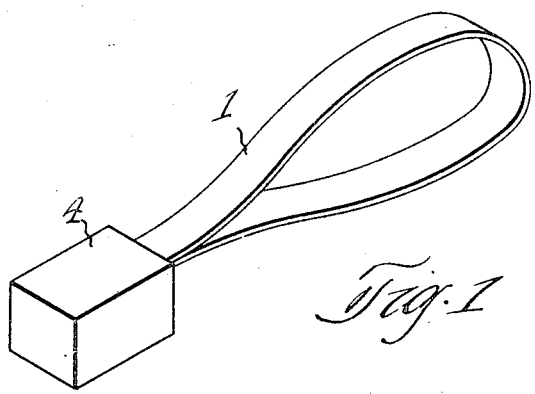
Figure 2:
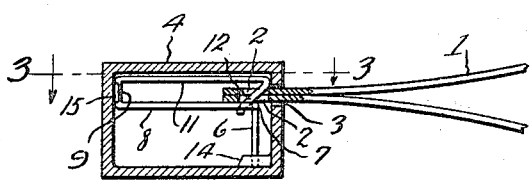
Figure 4:
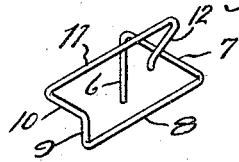
Figure 3:
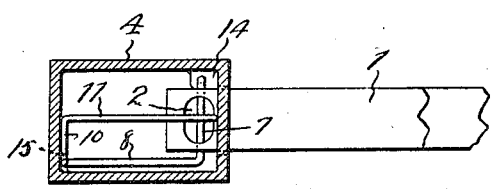

Further and more limited objects will be realized from the detailed description and accompanying drawing forming a part of the application and wherein Fig. 1 is a perspective view of a seal constructed in accordance with my invention; Fig. 2 is a longitudinal sectional view therethrough; Fig. 3 is a sectional view taken on the line 3—3 of Fig. 2; and Fig. 4 is a detail in perspective view showing the locking element removed from its housing.

Describing the various parts by reference characters 1 denotes a strip of any suitable metal such as steel which is provided adjacent each end thereof with an aperture 2. This strip is adapted to be inserted through the elements to be sealed and then bent upon itself to bring the ends thereof together and the apertures 2 in alignment. The ends of the strip are then inserted through an opening 3 formed in housing 4 which may be a hollow metal casting. This housing encloses a spring wire latch which is adapted to securely retain the ends of strip 1, once they have been inserted into the housing through opening 3. As shown in Fig. 4 the wire latch is formed with a depending leg 6, a laterally extending portion 7, a rearwardly extending portion 8, an upwardly directed portion 9, a laterally extending portion 10, and a forwardly extending portion 11 which projects beyond the portion 7 and is bent upon itself to form a hook 12 which normally contacts with said laterally extending portion 7.

In practice this wire latch is positioned in the said core so that the depending leg 6 will be embedded in a lug 14 formed in housing 4 when said housing is cast and the upwardly directed portion 9 will be supported by a projection 15 also formed when said housing is cast. The hook 12 is disposed adjacent the opening 3 in the housing and when the ends of strip 1 are inserted therein, the hook will ride over the ends of the strip and snap into openings 2 to securely retain the ends thereof. The ends of the strip cannot be removed without breaking the housing 4 or cutting strip 1 which of course would indicate that the object sealed has been tampered with.

The seal may be quickly and easily applied by inexperienced persons without the use of tools.

Having thus described my invention, what I claim is:

A seal of the character set forth comprising a strip of metal adapted to link the elements to be sealed and provided adjacent each end with an aperture, and a substantially rectangular hollow metal housing provided with an opening and having a latch positioned therein, said latch being formed from wire and having one end thereof fastened to said housing, said latch extending across the opening in said housing and along one side and across the wall opposite to said opening and thence forwardly and terminating in a hook, said hook contacting with the portion of said latch extending across said opening and adapted to engage in the apertures in the ends of said strip.

In testimony whereof, I hereunto affix my signature.

EMANUELE J. PASSANISI.